United States Patent
Shimada et al.

(10) Patent No.: US 12,280,724 B2
(45) Date of Patent: Apr. 22, 2025

(54) ROUTING STRUCTURE OF WIRE HARNESS OF SENSOR FOR DOOR OF AUTOMOBILE

(71) Applicants: NISHIKAWA RUBBER CO., LTD., Hiroshima (JP); HONDA MOTOR CO., LTD., Tokyo (JP)

(72) Inventors: Hiroshi Shimada, Hiroshima (JP); Toshifumi Matsuura, Hiroshima (JP); Makoto Seki, Wako (JP); Takashi Fukahori, Tokyo (JP); Hiroshi Shingu, Marysville, OH (US)

(73) Assignees: NISHIKAWA RUBBER CO., LTD., Hiroshima (JP); HONDA MOTOR CO., LTD., Tokyo (JP)

( * ) Notice: Subject to any disclaimer, the term of this patent is extended or adjusted under 35 U.S.C. 154(b) by 222 days.

(21) Appl. No.: 18/309,406

(22) Filed: Apr. 28, 2023

(65) Prior Publication Data
US 2024/0359642 A1 Oct. 31, 2024

(51) Int. Cl.
*B60R 16/02* (2006.01)
*E05F 15/44* (2015.01)

(52) U.S. Cl.
CPC ........ *B60R 16/0215* (2013.01); *E05F 15/443* (2015.01)

(58) Field of Classification Search
CPC ............................ B60R 16/0215; E05F 15/443
USPC ........................................................ 174/68.1
See application file for complete search history.

(56) References Cited

U.S. PATENT DOCUMENTS

| | | |
|---|---|---|
| 6,339,305 B1 | 1/2002 | Ishihara et al. |
| 2006/0096383 A1 | 5/2006 | Yamamoto et al. |
| 2020/0270929 A1 | 8/2020 | Sakata et al. |
| 2023/0258036 A1* | 8/2023 | Paerschke ................ H02P 7/05 49/324 |

FOREIGN PATENT DOCUMENTS

| | | |
|---|---|---|
| JP | H11-182136 A | 7/1999 |
| JP | H11-191337 A | 7/1999 |
| JP | H11-271154 A | 10/1999 |
| JP | H11-283459 A | 10/1999 |
| JP | 2000-073654 A | 3/2000 |
| JP | 2000-087642 A | 3/2000 |
| JP | 2000-171311 A | 6/2000 |
| JP | 2000-292279 A | 10/2000 |
| JP | 2006-131144 A | 5/2006 |
| JP | 2007-176322 A | 7/2007 |
| JP | 2014-196654 A | 10/2014 |

(Continued)

*Primary Examiner* — Timothy J Thompson
*Assistant Examiner* — Michael F McAllister
(74) *Attorney, Agent, or Firm* — Rankin, Hill & Clark LLP

(57) ABSTRACT

To provide an inexpensive routing structure, which is improved in sealing performance with no harm in noise insulation performance, of a wire harness of a sensor for a door of an automobile. The routing structure includes a wire harness of a sensor. The sensor couples to a flange of a rear door of the automobile with a bracket, and detects an electric signal which provides an indication that an object is between the rear door and a front door. The wire harness passes through a through hole, provided on an inner panel of the rear door, and is routed into a space between the inner panel and an outer panel. The through hole is a service hole, provided on a door side surface of the inner panel.

4 Claims, 12 Drawing Sheets

(56) References Cited

FOREIGN PATENT DOCUMENTS

| | | | |
|---|---|---|---|
| JP | 2017-206957 | A | 11/2017 |
| JP | 2018-114771 | A | 7/2018 |
| JP | 2018-158681 | A | 10/2018 |
| JP | 2019-087438 | A | 6/2019 |
| JP | 2019-207765 | A | 12/2019 |

* cited by examiner

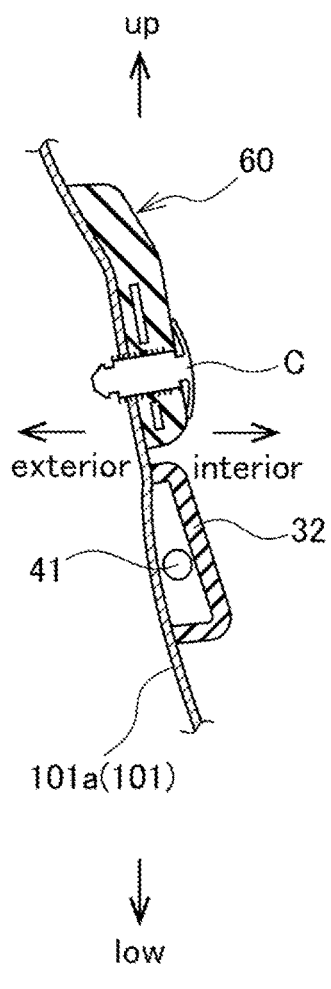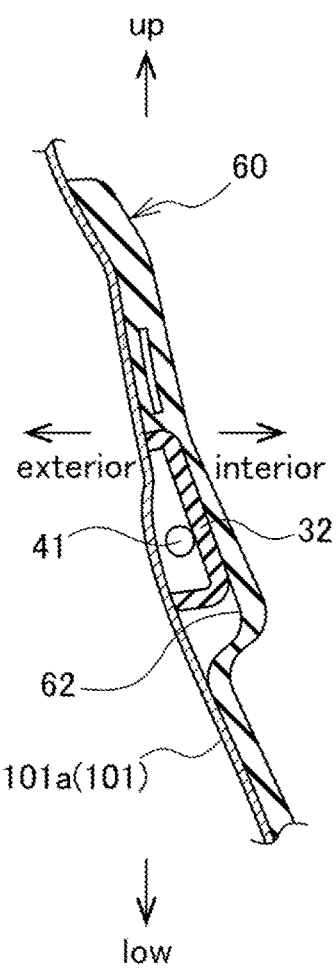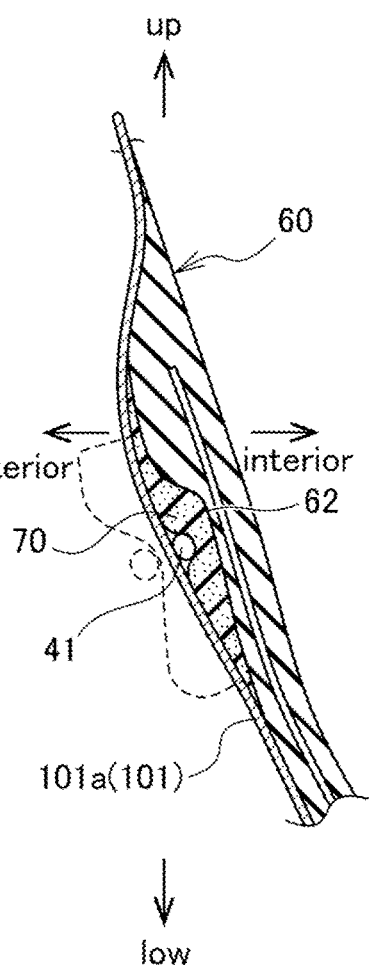

G — G

I — I

ROUTING STRUCTURE OF WIRE HARNESS OF SENSOR FOR DOOR OF AUTOMOBILE

TECHNICAL FIELD

The present invention relates to a routing structure of a wire harness of a sensor for a door of an automobile. The sensor couples to a flange of a rear door, a sliding door for example, of the automobile, and detects an electric signal which provides an indication that an object is between the rear door and a front door.

BACKGROUND OF THE INVENTION

As illustrated in FIG. 11, a pressure sensitive sensor 3 couples to a flange on a front edge of a sliding door (rear door) 1, and extends in an upper-lower direction. The pressure sensitive sensor 3 detects the electric signal which provides the indication that the object is between the sliding door 1 and a front door 2 (see, for example, FIG. 4 of Patent document 1). The object includes part of a human body, e.g. fingers.

A power supply wire harness (lead line) 4, which is joined with the pressure sensitive sensor 3 on an outer-cabin side of the wire harness 4, passes through a hole 5 on the sliding door 1, is guided and routed inside the sliding door 1 (between an inner panel 1a and an outer panel 1b).

The hole 5 is provided on part of a first stepped portion 1a1, which is adjacent a so-called hemming joint portion HM and is closer to an interior of the automobile than the hemming joint portion HM. The hemming joint portion HM is prepared by bending a front edge of the outer panel 1b toward a front edge of the inner panel 1a, to overlap an inner-cabin side part of the inner panel 1a.

Providing the hole 5 on the sliding door 1, however, lowers noise insulation performance.

Also, this necessitates prevention of water infiltration into the sliding door 1.

A grommet 6 couples to the hole 5 in FIG. 11, to protect the wire harness 4. Unfortunately, however, tightly coupling the grommet 6 to the hole 5 without gaps aiming at prevention of water infiltration is difficult. Providing a cover member (seal member) 7, a molded rubber for example, around the grommet 6 as well as the grommet 6 increases manufacturing cost.

FIG. 12 illustrates a wire harness (lead line) 11, which is routed on a routing surface 12a of a first wall of a bracket 12, to hold the wire harness 11 stably. Also, a seal sponge (illustration omitted) into which the wire harness (lead line) 11 is inserted may be fixed to a surface 14a of a holding wall 14 at a portion where the wire harness 11 is drawn out from a guide hole 13, to fix the wire harness 11 (see, for example, paragraph [0039] of Patent document 2). Patent document 2 is silent about guiding the wire harness 11 into the rear door.

A door side surface of a door inner panel with an opining H (illustration omitted) (see, for example, (FIG. 1), (FIG. 9) of Patent document 3) as well as the hole 5 disclosed in Patent document 1 is widely known. The opening H is a large hole used to take out or in a mechanism (rail, dram, wire, motor, for example) to lift and lower a door glass.

DESCRIPTION OF THE PRIOR ART

Patent Documents

Patent document 1: Japanese Unexamined Patent Application Publication No. 2006-131144

Patent document 2: Japanese Unexamined Patent Application Publication No. 2018-158681

Patent document 3: Japanese Unexamined Patent Application Publication No. 2018-114771

DISCLOSURE OF THE INVENTION

Problems to be Solved by the Invention

To solve the above problems, it is an object of the present invention to provide an inexpensive routing structure, which is improved in sealing performance with no harm in noise insulation performance, of a wire harness of a sensor for a door of an automobile.

Means to Solve the Problems

To achieve the above object, an aspect of the present invention provides a routing structure of a wire harness of a sensor for a door of an automobile. The routing structure includes a sensor (40), a bracket (30), a rear door (101), a through hole (H), a wire harness (41), and a service hole (H).

The sensor (40) couples to a flange of the rear door (101) of the automobile, has the wire harness (41), and detects an electric signal which provides an indication that an object is between the rear door (101) and a front door (102).

The bracket (30) fixes the sensor (40) to the flange of the rear door (101).

The rear door (101) includes an inner panel (101a) and an outer panel (101b).

The through hole (H) is provided on the inner panel (101a) of the rear door (101).

The wire harness (41) passes through the through hole (H), and is routed into a space between the inner panel (101a) and the outer panel (101b).

The through hole (H) is the service hole (H). The service hole (H) is provided on a door side surface of the inner panel (101a).

In addition, according to an aspect of the present invention, the wire harness (41) is fit between a lateral side part (32) of the bracket and the inner panel (101a) on a lower part of the rear door (101) from the sensor (40) before reaching to the through hole (H). The lateral side part (32) of the bracket extends in a front-rear direction of the rear door (101) from the bracket (30).

The routing structure further includes a cover member (60) provided on the lower part of the rear door (101). The cover member (60) makes elastic contact with the front door (102) when the rear door (101) and the front door (102) are in closed positions. The cover member (60) has a channel (62). The channel (62) extends in the front-rear direction of the rear door (101). The channel (62) covers an inner-cabin side of the lateral side part (32) of the bracket.

In addition, according to an aspect of the present invention, a front part of the channel (62) covers a rear part of the lateral side part (32) of the bracket, a rear part of the channel (62) is opposite the inner panel (101a) without the lateral side part (32) of the bracket.

The rouging structure further includes a sponge material (70) provided on the rear part of the channel (62), the sponge material (70) makes elastic contact with the wire harness (41) and shuts a space between the inner panel (101a) and the cover member (60) tightly.

In addition, according to an aspect of the present invention, the routing structure further includes a lid (80) which closes an opening on a rear edge of the channel (62).

Symbols in parentheses show constituents or items corresponding to the drawings.

Effect of the Invention

According to the present invention, the wire harness extends from the sensor, passes through the service hole provided on the door side surface, and is routed into the space between the inner panel and the outer panel, or into the rear door. This eliminates the need for formation of an extra hole apart from the service hole for taking in the wire harness, and prevents a lowering of noise insulation performance.

The absence of the extra hole on the rear door apart from the service hole prevents water infiltration which would be incurred under the presence of an extra through hole. Also, this prevents increase in manufacturing cost for a molded rubber used to close the extra hole.

In addition, the wire harness is covered with the lateral side part of the bracket and the cover member from the sensor before reaching to the service hole, in which the wire harness is to be drawn. The lateral side part of the bracket extends from the bracket to which the sensor couples. The wire harness is fit in the channel on the cover member. The channel covers the inner-cabin side of the lateral side part of the bracket. This protects the wire harness stably on a fixed position.

In addition, the sponge material, provided on the rear part of the channel on the cover member, makes elastic contact with the wire harness and shuts the space between the inner panel and the cover member tightly. This prevents water infiltration toward the interior of the automobile along the channel under slight misalignment of the wire harness.

In addition, the lid closes the opening on the rear edge of the channel on the cover member. This prevents water infiltration further.

BRIEF DESCRIPTION OF DRAWINGS

FIG. 8A is an enlarged vertical cross-sectional view showing a positional relation among the rear door, a lateral side part of a bracket, and a cover member taken along line VIIIA-VIIIA in FIG. 4 with an inner panel of the rear door illustrated. FIG. 8B is an enlarged vertical cross-sectional view taken along line VIIIB-VIIIB in FIG. 4. FIG. 8C is an enlarged vertical cross-sectional view taken along line VIIIC-VIIIC in FIG. 4.

DETAILED DESCRIPTION

Referring to Drawing, a routing structure according to an embodiment of the present invention of a wire harness of a sensor for a door of an automobile will be described.

Figure 1:
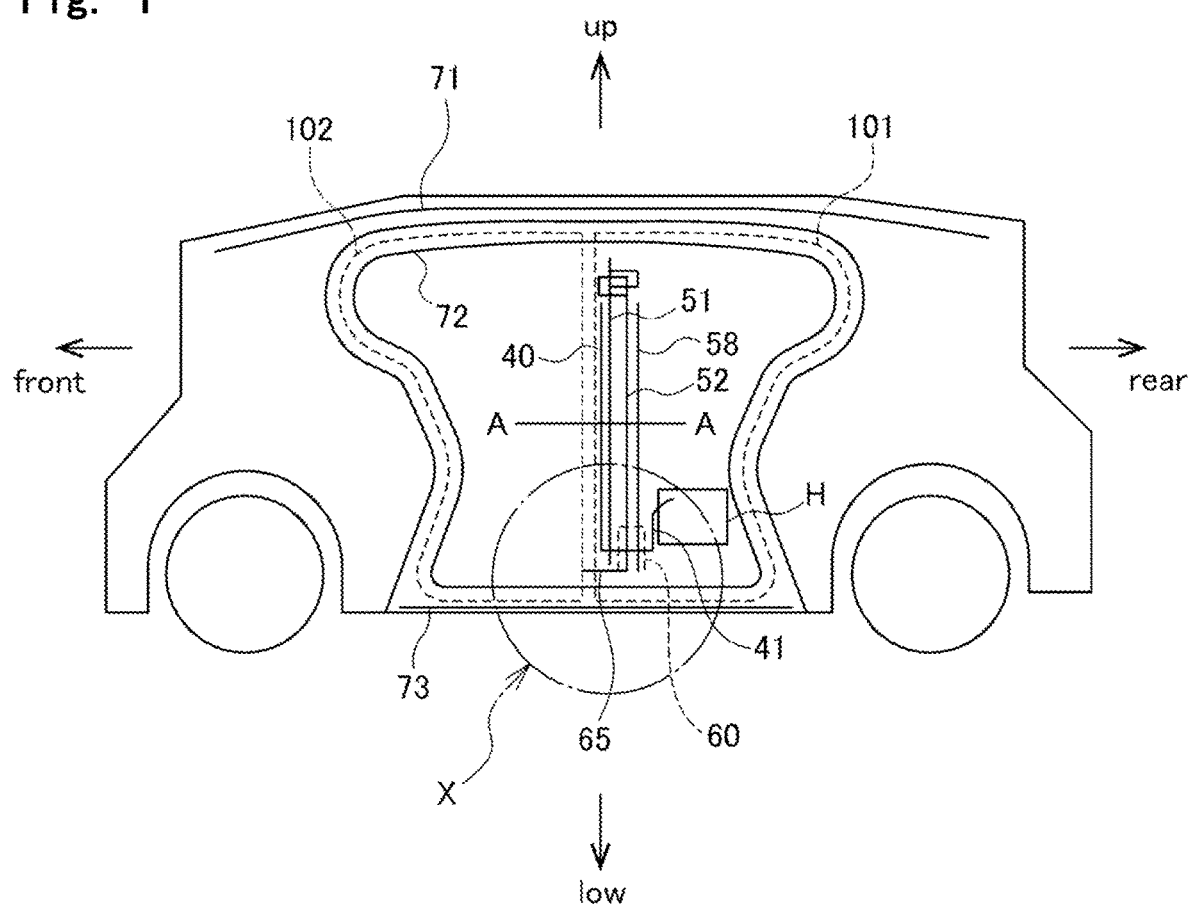
FIG. 1 is a schematic side view of an automobile with a routing structure according to an embodiment of the present invention of a wire harness of a sensor for a door of an automobile.

As illustrated in FIG. 1, the structure includes a wire harness 41 of a sensor 40. The sensor 40 couples to a flange of a rear door 101 of the automobile and detects an electric signal which provides an indication that an object is between the rear door 101 and a front door 102. The wire harness 41 passes through a through hole H, which is provided on the rear door 101, and is routed into the rear door 101. This embodiment describes the rear door 101 and the front door 102 on the left side of the automobile, but the right side of the automobile has the same configuration.

Figure 2:
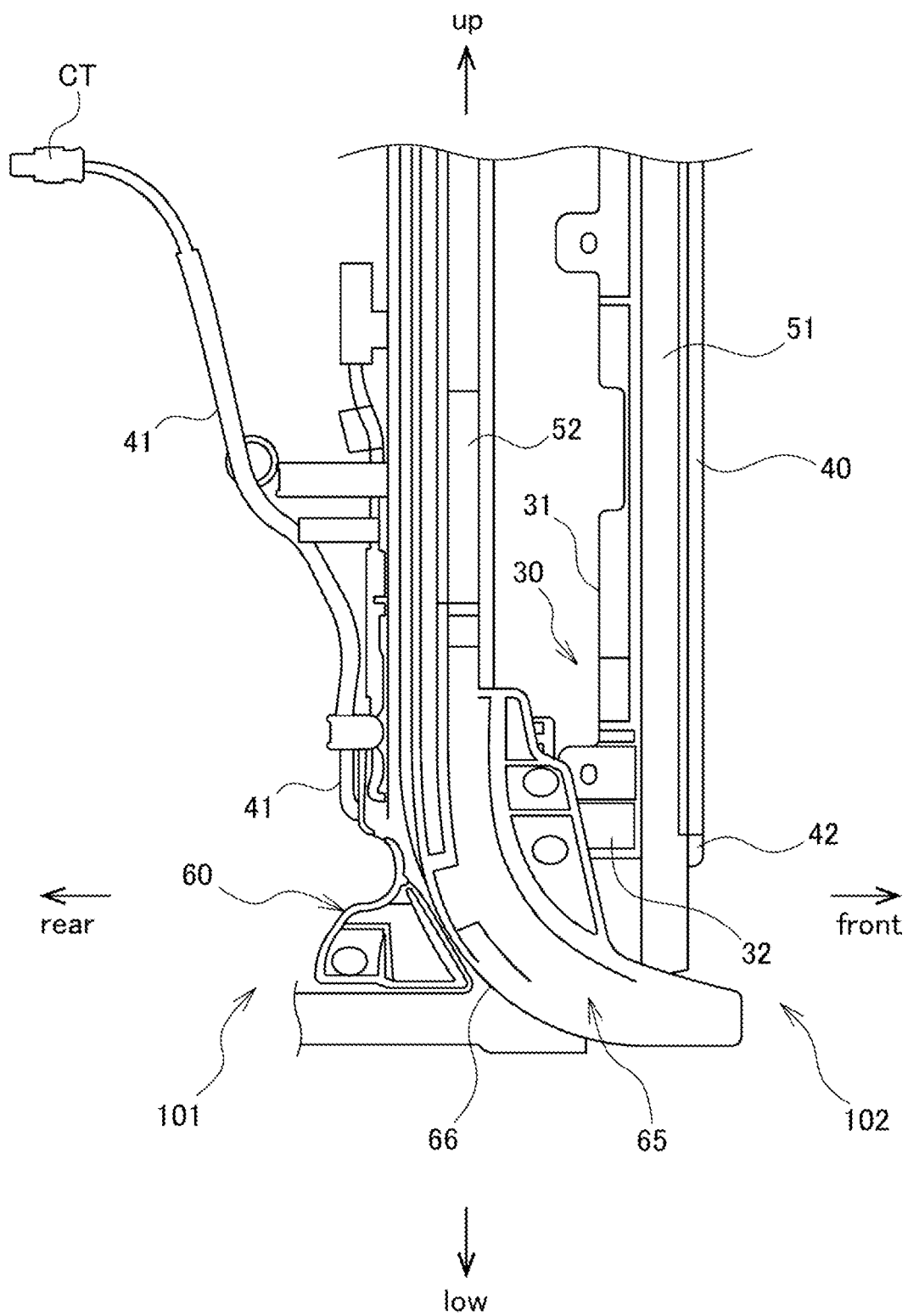
FIG. 2 is an enlarged side view of part X in FIG. 1 as viewed from an interior of the automobile.
Figure 3:
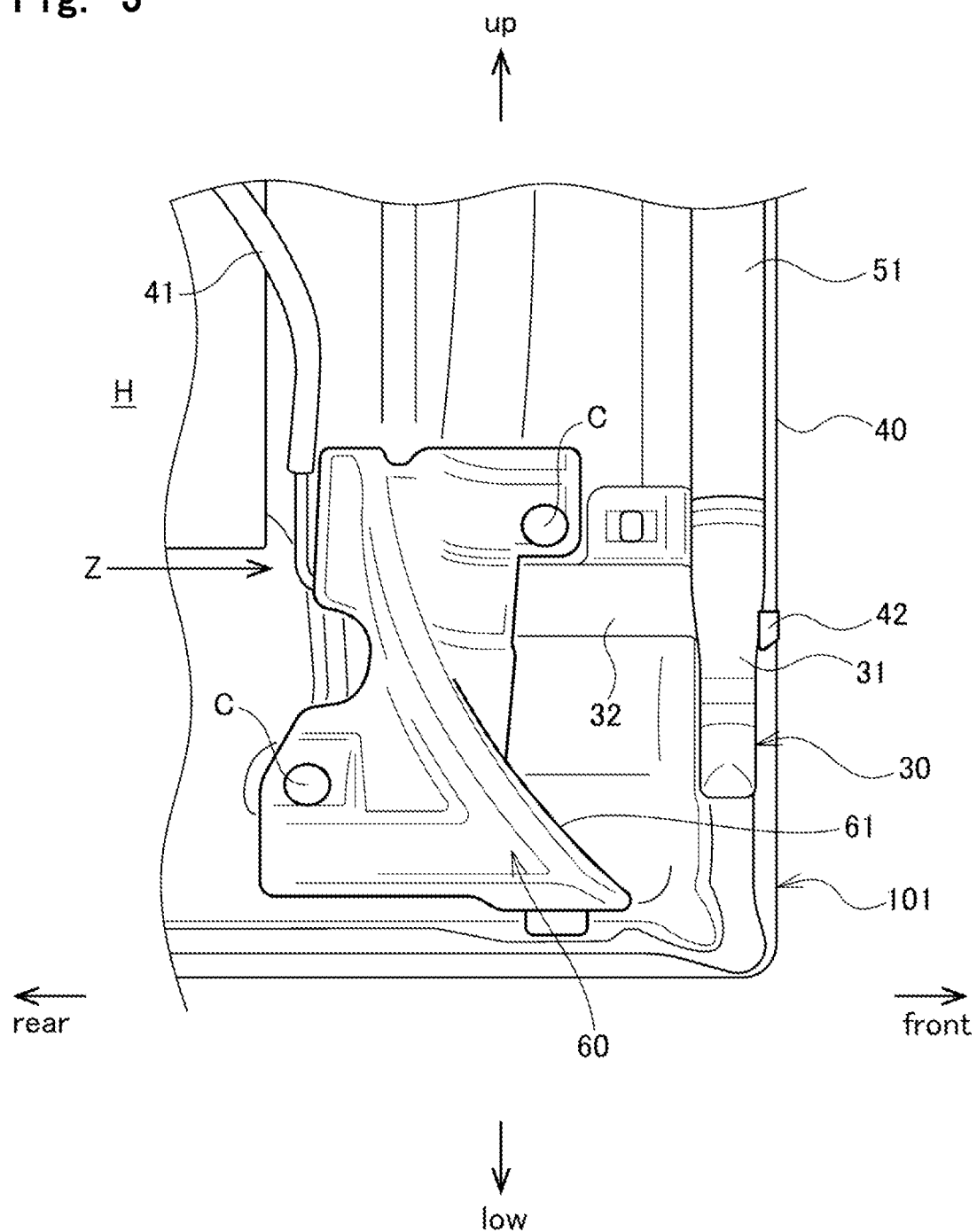
FIG. 3 is an enlarged side view of a lower part of a rear door in FIG. 1 as viewed from the interior of the automobile.
Figure 4:
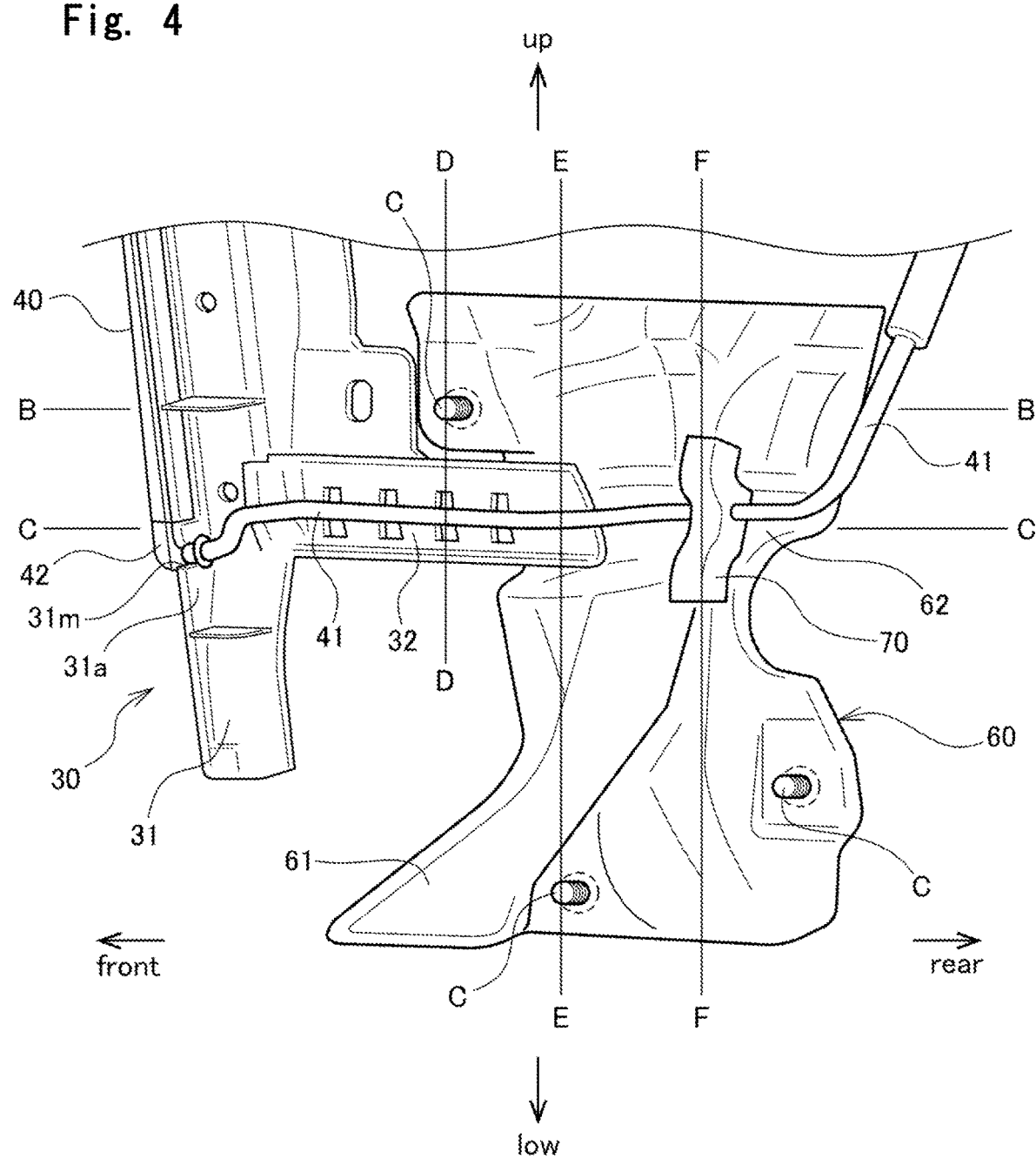
FIG. 4 is an enlarged perspective view showing a positional relation between a bracket and a cover member in FIG. 3 as viewed from an exterior of the automobile with illustration of a rear door omitted.

As illustrated in FIGS. 2 to 4, the sensor 40 is a pressure sensitive sensor which couples to the flange on a front edge of the rear door 101 with a bracket 30, and extends in an upper-lower direction.

Figure 5:
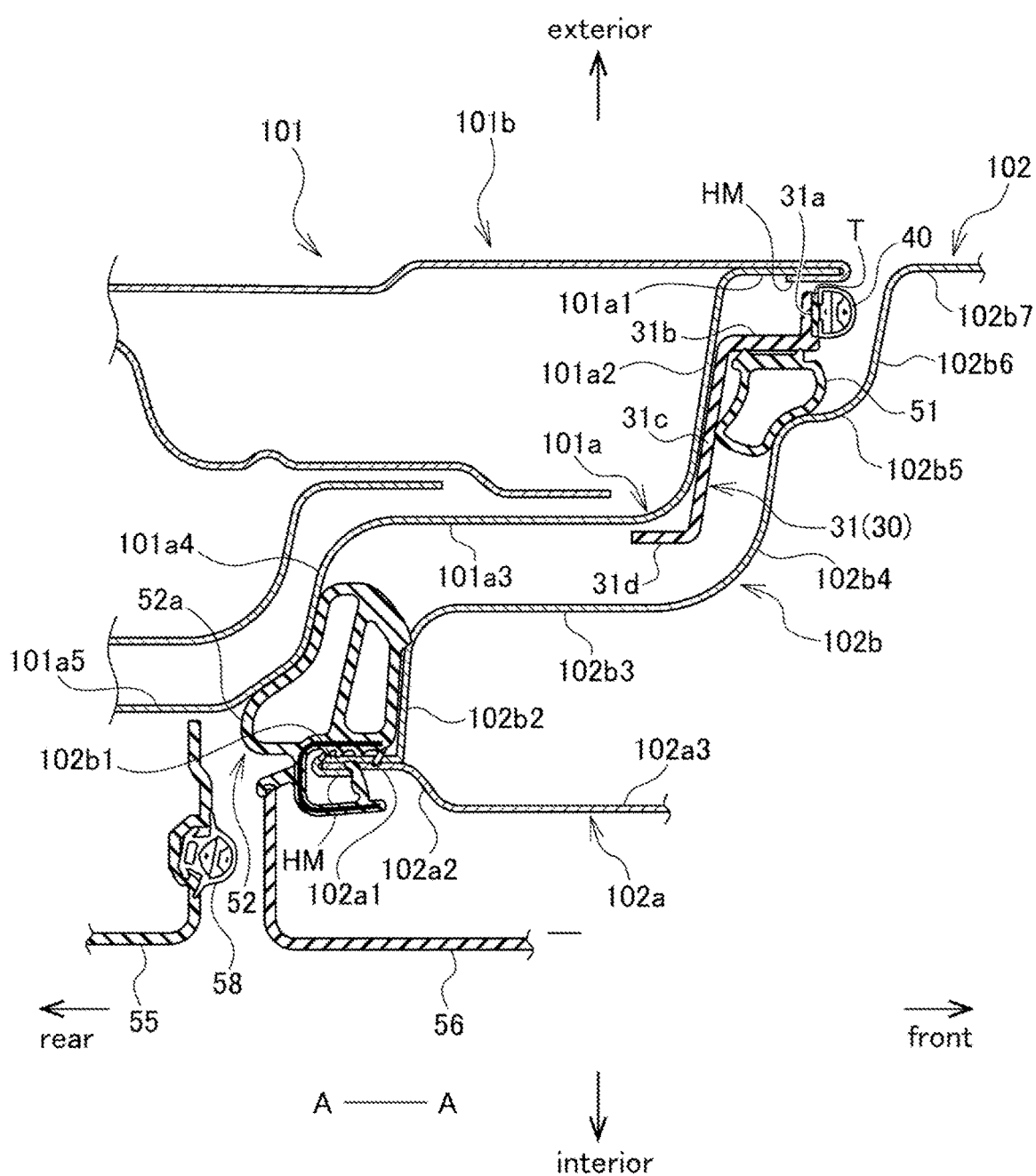
FIG. 5 is an enlarged cross-sectional view taken along line V-V in FIG. 1.

As illustrated in FIG. 5, which is a cross-sectional view taken along line V-V in FIG. 1, the rear door 101 is a sliding door, which moves in a front-rear direction of an automobile body of the automobile, and includes an inner panel 101$a$ and an outer panel 101$b$.

The inner panel 101$a$ includes: a front edge surface 101$a$1, which protrudes and extends forward toward a front part of the automobile body; a first stepped surface 101$a$2, which extends inward toward an interior of the automobile and inclines rearward toward a rear part of the automobile body from a rear edge of the front edge surface 101$a$1; a first parallel surface 101$a$3, which extends rearward from an inner-cabin side edge of the first stepped surface 101$a$2; a second stepped surface 101$a$4, which extends inward from a rear edge of the first parallel surface 101$a$3; and a second parallel surface 101$a$5, which extends rearward from an inner-cabin side edge of the second stepped surface 101$a$4.

A front edge of the outer panel 101$b$ is bent inward and holds the front edge surface 101$a$1 of the inner panel 101$a$, to prepare a hemming joint portion HM.

The front door 102 is also a sliding door, which moves in the front-rear direction of the automobile body, and includes an inner panel 102$a$ and an outer panel 102$b$.

The inner panel 102$a$ includes: a rear edge surface 102$a$1, which protrudes and extends rearward; an inclined surface 102$a$2, which inclines and extends inward from a front edge of the rear edge surface 102$a$1; and a parallel surface 102$a$3, which extends forward from a front edge of the inclined surface 102$a$2.

The outer panel 102$b$ includes: a rear edge surface 102$b$1, which protrudes and extends rearward; a first stepped surface 102$b$2, which extends outward from a front edge of the rear edge surface 102$b$1; a first parallel surface 102$b$3, which extends forward from an outer-cabin side edge of the first stepped surface 102$b$2; a second stepped surface 102$b$4, which extends outward from a front edge of the first parallel surface 102*b*3; a second parallel surface 102*b*5, which extends forward from an outer-cabin side edge of the second stepped surface 102*b*4; a third stepped surface 102*b*6, which extends outward from a front edge of the second parallel surface 102*b*5; and a third parallel surface 102*b*7, which extends forward from an outer-cabin side edge of the third stepped surface 102*b*6. A rear edge of the outer panel 102*b* is bent inward and holds the rear edge surface 102*a*1 of the inner panel 102*a*, to prepare the hemming joint portion HM.

As illustrated in FIGS. 2 to 4, the bracket 30 includes: a vertical side part 31 of the bracket, which extends in an upper-lower direction; and a lateral side part 32 of the bracket, which extends in a front-rear direction of the automobile (rear door 101). The lateral side part 32 extends toward a rear part of the rear door 101 from the vertical side part 31 on a lower part of the rear door 101.

As illustrated in FIG. 5, the vertical side part 31 includes: a coupling surface 31*a*, which extends in an inner-cabin and outer-cabin direction, of which outer-cabin side end is adjacent the front edge surface 101*a*1 of the inner panel 101*a* of the rear door 101, and to which a rear side surface of the sensor 40 is fixed, for example with double-sided tape T; a first parallel surface 31*b*, which extends rearward from an inner-cabin side edge of the coupling surface 31*a*; an inclined surface 31*c*, which extends inward and inclines rearward from a rear edge of the first parallel surface 31*b*; and a second parallel surface 31*d*, which extends rearward from an inner-cabin side edge of the inclined surface 31*c*.

The inclined surface 31*c*, which is parallel to the first stepped surface 101*a*2 of the inner panel 101*a* of the rear door 101, touches and couples to the rear door 101.

Figure 6:
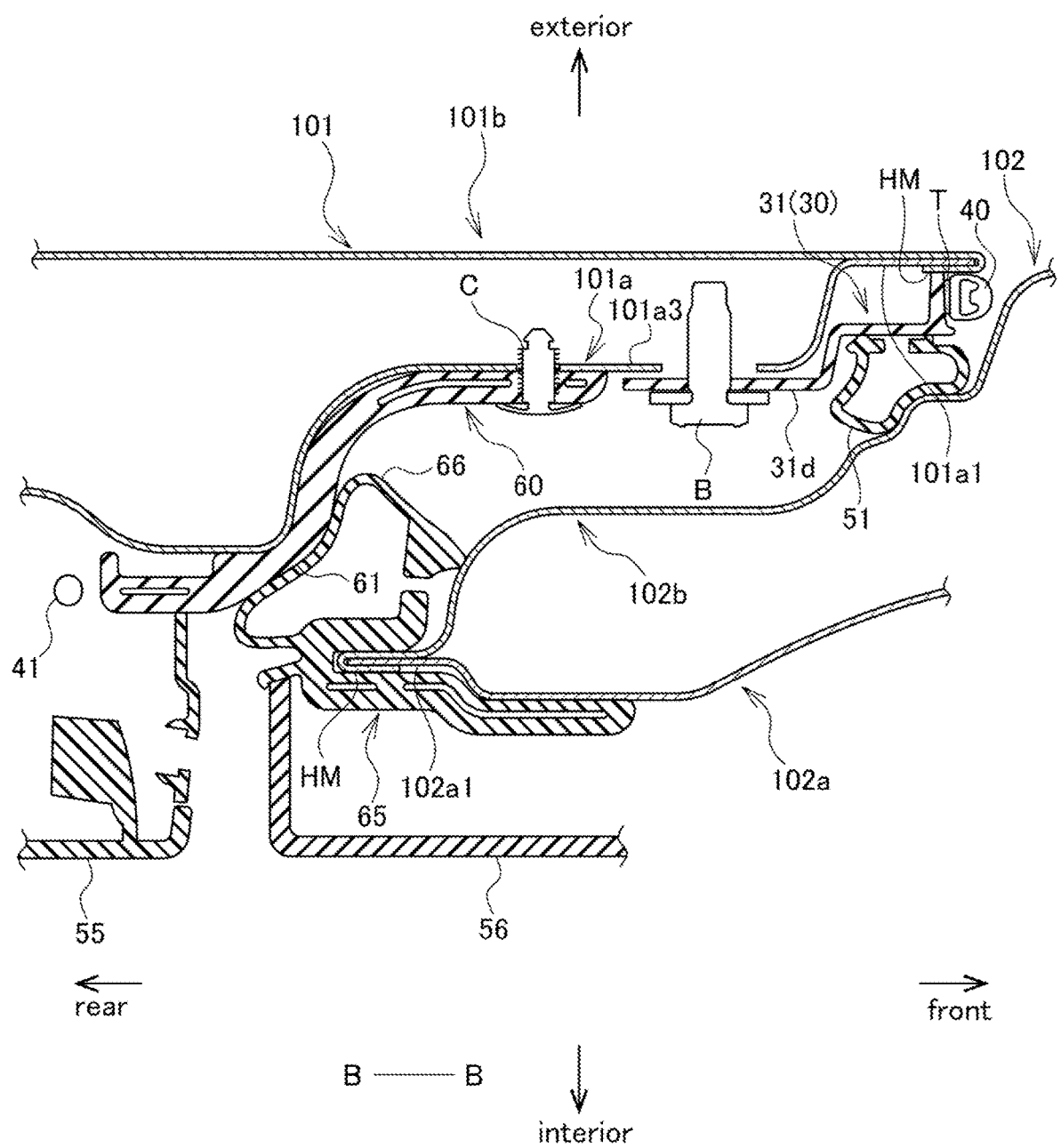
FIG. 6 is an enlarged cross-sectional view taken along line VI-VI in FIG. 4 with the rear door and a front door illustrated.

As illustrated in FIG. 6, the second parallel surface 31*d*, which is parallel to the first parallel surface 101*a*3 of the inner panel 101*a* of the rear door 101, is fixed to the first parallel surface 101*a*3 with means B of fixture including bolts or screws.

Figure 7:
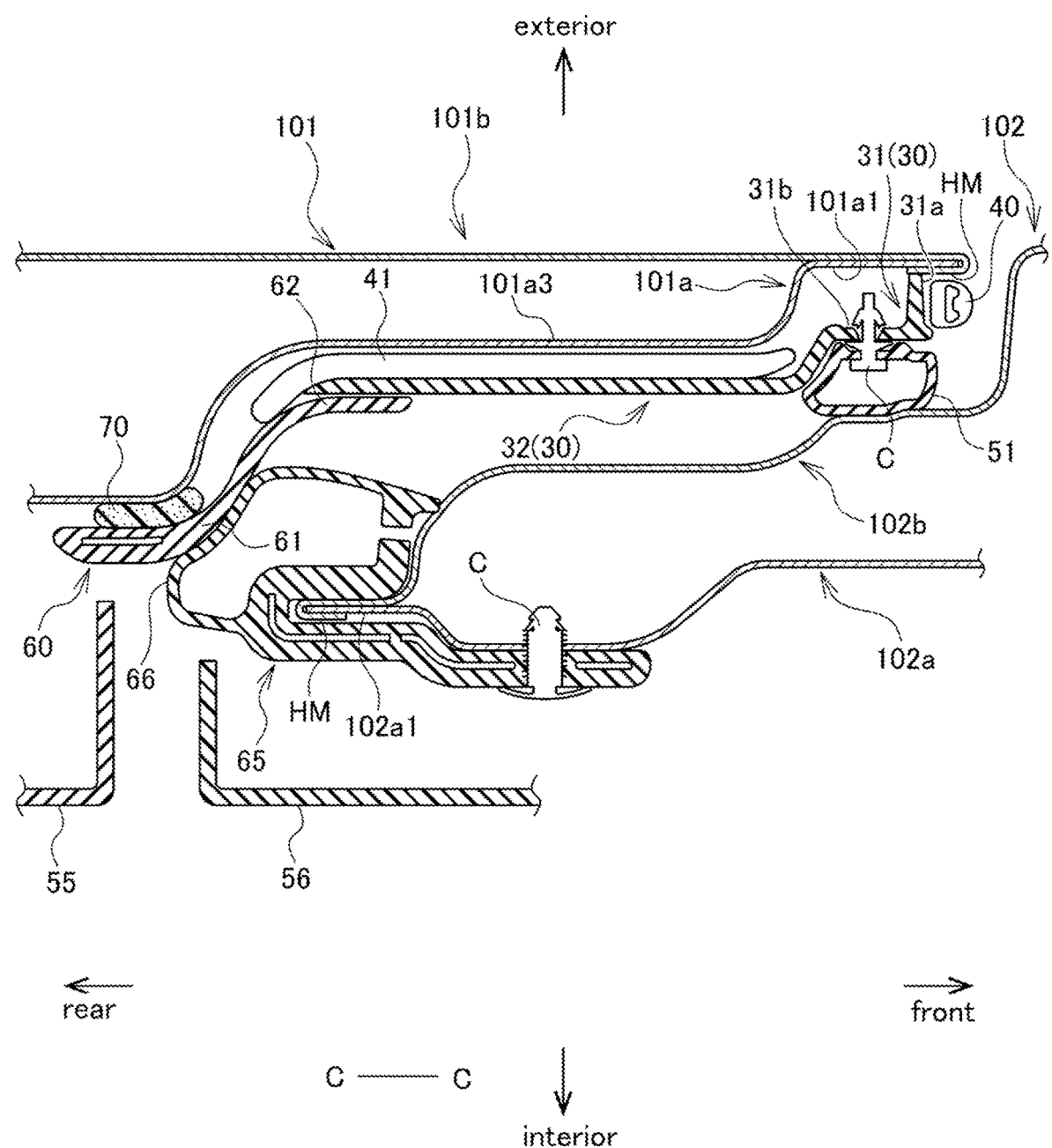
FIG. 7 is an enlarged cross-sectional view taken along line VII-VII in FIG. 4 with the rear door and the front door illustrated.

As illustrated in FIGS. 5 and 7, a center seal 51, which has a hollow shape, is fixed to an inner-cabin side of the first parallel surface 31*b* with clips C. The center seal 51 makes elastic contact with the front door 102 when the rear door 101 and the front door 102 are in closed positions, to seal a gap between an interior and an exterior of the automobile. A main seal 52, which has the hollow shape, is provided on the hemming joint portion HM at the rear part of the front door 102. The main seal 52 makes elastic contact with the rear door 101 when the rear door 101 and the front door 102 are in the closed positions, to seal a gap between the interior and an exterior of the automobile.

The rear door 101 has an interior trim component (first interior trim component 55 for the rear door) and the front door 102 has the interior trim component (second interior trim component 56 for front door) provided on an inner-cabin side of the doors 101, 102. The first interior trim component 55 has an inner sensor 58 provided on a front part. The inner sensor 58 detects the electric signal which provides the indication that the object is between the rear door 101 and the front door 102 in the same manner as the sensor 40.

As illustrated in FIG. 1, a first gap seal 71 for an upper part of the automobile body, a main seal 72 for the automobile body, and a second gap seal 73 for a lower part of the automobile body are provided on the door opening, which is opposite the rear door 101 and the front door 102. The seals 71, 72, 73 make elastic contact with the rear door 101 and the front door 102 when the rear door 101 and the front door 102 are in the closed positions. The first gap seal 71 extends in the front-rear direction on the upper part of the automobile body. The main seal 72 encircles the whole circumference of the door opening. The second gap seal 73 extends in the front-rear direction on the lower part of the automobile body (illustration of cross-sectional shapes of the seals 71, 72, 73 omitted).

As illustrated in FIGS. 4 and 7, the wire harness 41 of the sensor 40 protrudes from a connecting part 42, passes through a space between a channel 31*m* and an inner-cabin side surface of the hemming joint portion HM, a space between the first parallel surface 31*b* and the front edge surface 101*a*1 of the inner panel 101*a* of the rear door 101, and a space between the lateral side part 32 and the first parallel surface 101*a*3 of the inner panel 101*a*, and extends rearward. The connecting part 42 is provided at a lower edge of the sensor 40. The channel 31*m* is provided on the coupling surface 31*a*. The hemming joint portion HM is prepared by bending the outer panel 101*b* of the rear door to hold the front edge surface 101*a*1 of the inner panel 101*a* of the rear door.

As illustrated in FIG. 4, a cover member 60 is fixed to the lower part of the rear door 101 with the clips C, and covers an inner-cabin side of a rear part of the lateral side part 32. The cover member 60 is formed by die molding material (elastic material including rubber or resin).

The cover member 60 includes a receiving part 61, which has a shape of a curved surface, at the center in a front-rear direction of the cover member 60. As illustrated in FIGS. 2, 6, and 7, the receiving part 61 makes elastic contact with a curved part 66 when the rear door 101 and the front door 102 are in the closed positions, to enhance watertightness. The curved part 66 has a hollow shape, and is provided at a rear part of a corner seal 65. The corner seal 65 is formed by die molding material (elastic material including rubber or resin), and is provided on a lower part of the front door 102. The corner seal 65 couples to the hemming joint portion HM, which is prepared by bending the outer panel 102*b* to hold the rear edge surface 102*a*1 of the inner panel 102*a* on the lower part of the front door 102. An upper edge of the curved part 66 of the corner seal 65 is connected with a lower edge of a hollow seal member 52*a* of the main seal 52, illustrated in FIG. 5, continuously and integrally.

As illustrated in FIGS. 4, 7, and 8B, the cover member 60 includes a channel 62 at the center in a height direction of the cover member 60. The channel 62 extends horizontally in the front-rear direction of the rear door 101, and has an opening opposite the inner panel 101*a* of the rear door 101. The channel 62 covers a rear part of the lateral side part 32 with the rear part fit in the channel 62.

As illustrated in FIGS. 4, 7, and 8A, the wire harness 41 of the sensor 40 passes through a space between the lateral side part 32 and the inner panel 101*a* from the vertical side part 31, and extends rearward. As the wire harness 41 approaches the rear part of the automobile body, the channel 62 of the cover member 60 covers the lateral side part 32 as illustrated in FIGS. 4, 7, and 8B, and then the wire harness 41 is exposed from a rear edge of the lateral side part 32 and covered with the channel 62 without the lateral side part 32 as illustrated in FIGS. 4 and 7. The rear part of the channel 62 is opposite the inner panel 101*a*.

As illustrated in FIGS. 4 and 8C, a sponge material (caulking sponge) 70 is provided on the rear part of the channel 62. The sponge material 70 makes elastic contact with the wire harness 41, and shuts a space between the inner panel 101*a* and the cover member 60 tightly when constricted (illustrated with a solid line in FIG. 8C). FIG. 4 and a dotted line in 8C illustrates the sponge material 70 out of constriction.

Figure 9:
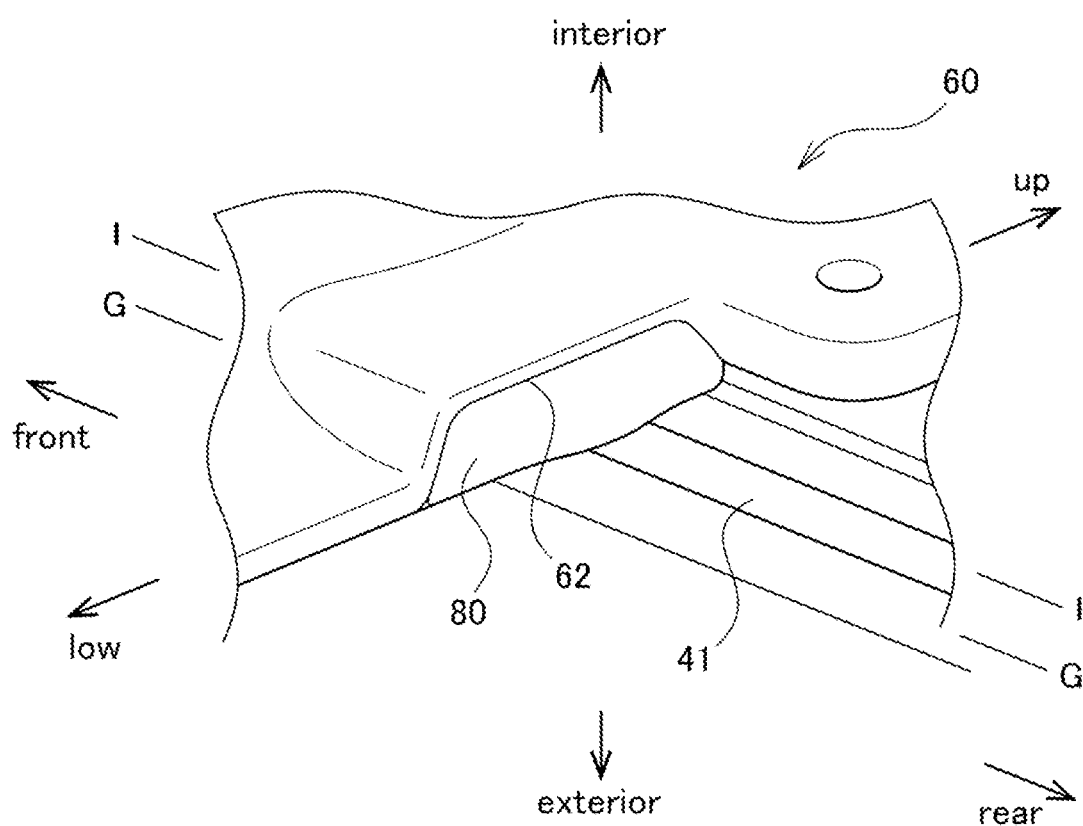
FIG. 9 is an enlarged fragmentary view taken in the direction of an arrow Z in FIG. 3.
Figure 10A:
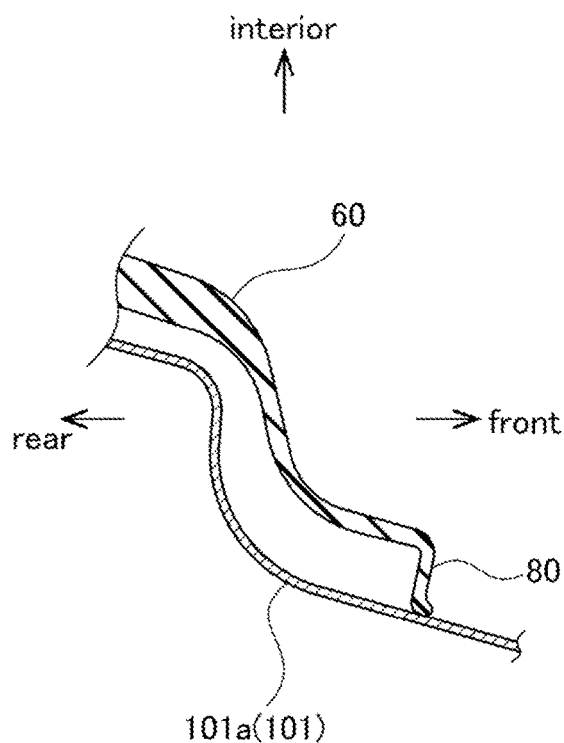
FIG. 10A is an enlarged cross-sectional view taken along line XA-XA in FIG. 9.
Figure 10B:
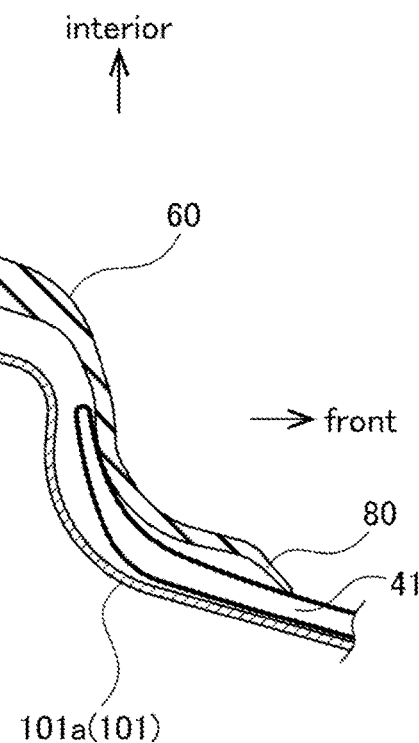
FIG. 10B is an enlarged cross-sectional view taken along line XB-XB in FIG. 9.

As illustrated in FIGS. 9, 10A, and 10B, a lid 80 is provided, to close an opening on a rear edge of the channel 62, from which the wire harness 41 is to be drawn out. This improves sealing performance. In this modification, it is only required that the lid 80 closes the opening and the lid 80 may have any shape.

The wire harness 41, which is drawn out from the channel 62 of the cover member 60 rearward, is pulled up to pass through a service hole H, which is provided on a door side surface of the inner panel 101a as illustrated in FIGS. 1 and 3. The wire harness 41 is routed into a space between the inner panel 101a and the outer panel 101b of the rear door 101, and is joined with a control unit of the automobile through a connector CT, illustrated in FIG. 2.

Figure 11:
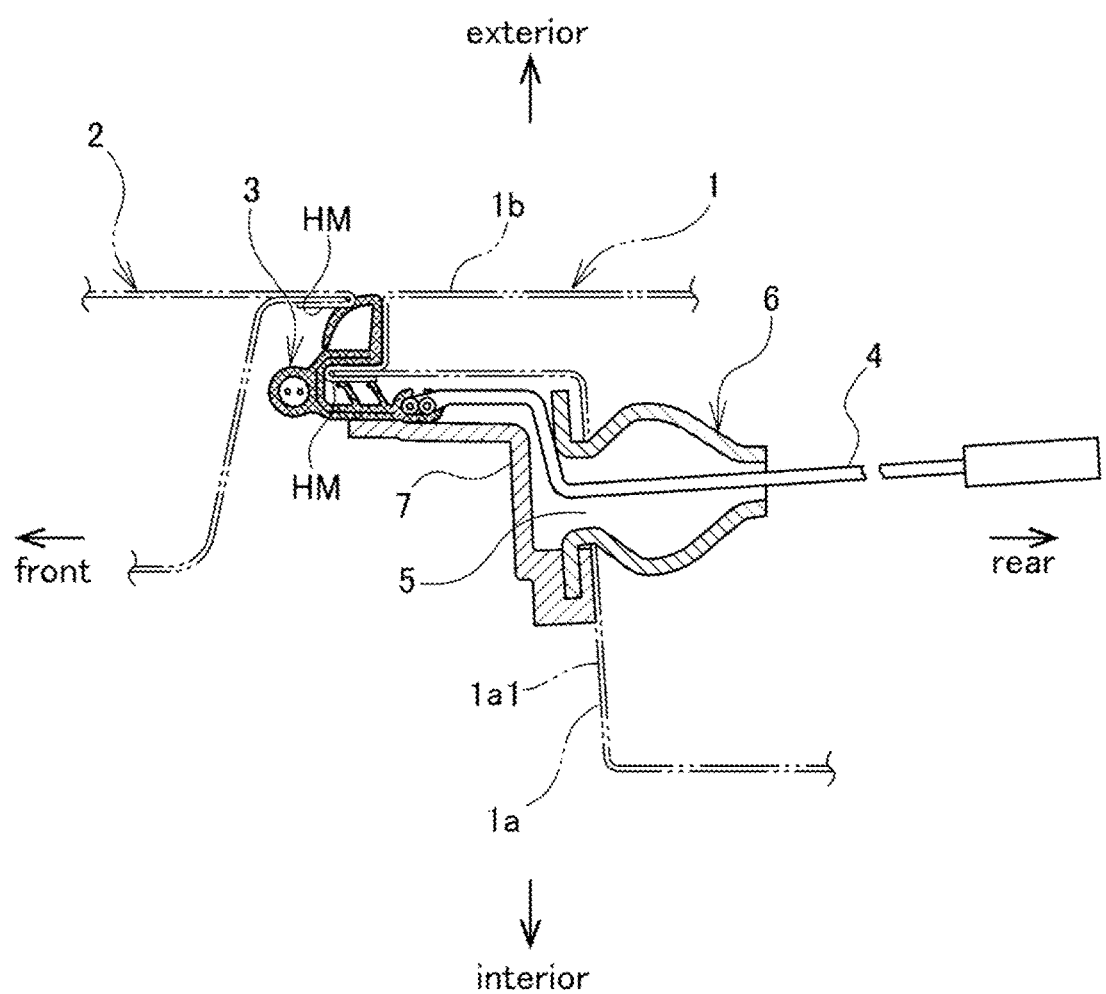
FIG. 11 is a cross-sectional view of the principal components of a conventional routing structure of the wire harness of the sensor for the door of the automobile.
Figure 12:
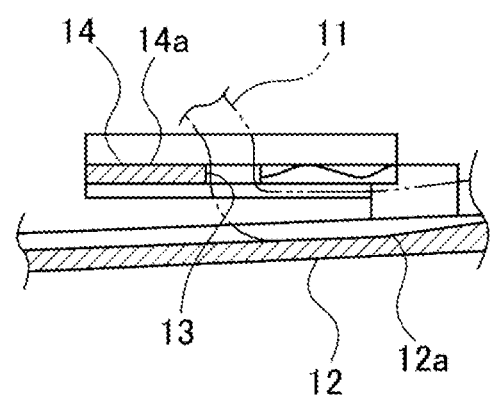
FIG. 12 is a cross-sectional view of the principal components of another conventional routing structure of the wire harness of the sensor for the door of the automobile.

The service hole H is an existing hole (large hole provided on the door side surface), which is used to take in and out inner parts of the automobile including regulators (illustration omitted) or to repair the inner parts. The service hole H is different from an extra through hole (hole 5 provided on a first stepped portion 1a1 in FIG. 11 of the conventional structure, for example), which is provided apart from the service hole H and from which the wire harness 41 is to be guided into the space between the inner panel 101a and the outer panel 101b of the rear door 101. The service hole H is closed by a door hole seal (illustration omitted), and the door hole seal is covered with the first interior trim component (door trim) 55. In this embodiment, the service hole H (through hole) corresponds to an opening H in Patent document 3.

The routing structure of this embodiment of the wire harness of the sensor for the door of the automobile includes the wire harness 41, which extends from the sensor 40, passes through the service hole H, and is routed into the rear door 101 (the space between the inner panel 101a and the outer panel 101b). This eliminates the need for formation of the extra hole apart from the service hole H for taking in the wire harness 41 (extra hole need not be provided, for example, on the first stepped surface 101a2 illustrated in FIG. 5, which corresponds to the first stepped portion 1a1 illustrated in FIG. 11), and prevents a lowering of noise insulation performance.

The absence of the extra hole on the rear door 101 apart from the service hole H prevents water infiltration which would be incurred under the presence of an extra through hole. Also, this eliminates manufacturing cost for a molded rubber used to close the extra hole.

In addition, the wire harness 41 is covered with the lateral side part 32 and the cover member 60 from the sensor 40 before reaching to the service hole H, in which the wire harness 41 is to be drawn. The lateral side part 32 extends from the bracket 30, to which the sensor 40 couples. The wire harness 41 is fit in the channel 62 on the cover member 60. The channel 62 covers the inner-cabin side of the lateral side part 32. This protects the wire harness 41 stably on a fixed position.

The cover member 60, which protects the wire harness 41, makes elastic contact with the corner seal 65, which is provided on the front door 102, when the rear door 101 and the front door 102 are in the closed positions. This enhances watertightness of a parting portion between the rear door 101 and the front door 102.

In addition, the sponge material 70, provided on the rear part of the channel 62 on the cover member 60, makes elastic contact with the wire harness 41 and shuts the space between the inner panel 101a and the cover member 60 tightly. This prevents water infiltration toward the interior of the automobile along the channel 62 under slight misalignment of the wire harness 41.

In addition, the lid 80 closes the opening on the rear edge of the channel 62 on the cover member 60. This prevents water infiltration further.

In the above embodiment, the rear door 101 and the front door 102 are sliding doors, which move in the front-rear direction of the automobile body. Alternatively, the rear door 101 and the front door 102 may be butterfly doors. It is only required that the sensor 40 for the door of the automobile couples to the flange on the front edge of the rear door 101 and detects the electric signal which provides the indication that the object is between the rear door 101 and the front door 102.

The invention claimed is:

1. A routing structure of a wire harness of a sensor for a door of an automobile, the routing structure comprising:
   the sensor which couples to a flange of a rear door of the automobile, the sensor having a wire harness, and the sensor being configured to detect an electric signal which provides an indication that an object is between the rear door and a front door;
   a bracket which fixes the sensor to a flange of the rear door;
   the rear door which includes an inner panel and an outer panel;
   a through hole which is provided on the inner panel of the rear door; and
   the wire harness which passes through the through hole, and the wire harness being routed into a space between the inner panel and the outer panel, wherein
   the through hole is a service hole, and the service hole is provided on a door side surface of the inner panel.

2. The routing structure as claimed in claim 1, wherein the wire harness is fit between a lateral side part of the bracket and the inner panel on a lower part of the rear door from the sensor before reaching to the through hole, the lateral side part of the bracket extends in a front-rear direction of the rear door from the bracket, and
   the routing structure further comprises a cover member provided on the lower part of the rear door, the cover member is configured to make elastic contact with the front door when the rear door and the front door are in closed positions, and the cover member has a channel, the channel extends in the front-rear direction of the rear door, and the channel covers an inner-cabin side of the lateral side part of the bracket.

3. The routing structure as claimed in claim 2, wherein a front part of the channel covers a rear part of the lateral side part of the bracket, a rear part of the channel is opposite the inner panel without the lateral side part of the bracket, and
   the routing structure further comprises a sponge material provided on the rear part of the channel, and the sponge material is configured to make elastic contact with the wire harness and shut a space between the inner panel and the cover member tightly.

4. The routing structure as claimed in claim 3, wherein the routing structure further comprises a lid configured to close a rear edge of an outer-cabin side edge of the channel.

* * * * *